INVENTOR.
HERBERT A. HARRINGTON AND
JOHN W. DICKEY,
BY
Youngblut, Melville, Strasser and Foster
ATTORNEYS March 7, 1967 H. A. HARRINGTON ET AL 3,308,072
METHOD AND APPARATUS FOR MAKING AN AIR FELTED
FIBROUS CATALYST BED
Filed Sept. 21, 1962 3 Sheets-Sheet 2

INVENTOR.
HERBERT A. HARRINGTON AND
JOHN W. DICKEY,
BY
Yungblut, Melville, Strasser and Foster
ATTORNEYS.

United States Patent Office 3,308,072
Patented Mar. 7, 1967

3,308,072
METHOD AND APPARATUS FOR MAKING AN AIR FELTED FIBROUS CATALYST BED
Herbert A. Harrington, Cincinnati, Ohio, and John W. Dickey, Esmont, Va. (both % Development Consultants, Inc., 5657 Vine St., Cincinnati, Ohio 45216)
Filed Sept. 21, 1962, Ser. No. 225,198
10 Claims. (Cl. 252—477)

This invention relates to the combustion of gaseous fuels under catalytic conditions. It is known that gaseous fuels may be burned by passing them through a pervious support for a catalyst into contact with oxygen from the surrounding atmosphere, and that the exothermic reaction will take place once the catalyst is heated to a threshold value. For example, heating devices have been made comprising a platinum-palladium catalyst on a pervious carrier, such as fibrous asbestos, the catalyst and carrier, together with suitable supporting means forming one side of an otherwise closed chamber. In former structures of this type electrical heating elements have been imbedded in the catalyst carrier. If a gaseous fuel such as natural gas, propane, or other gaseous substances having carbonaceous, hydro-carbon or hydrogen combustible values in them, is introduced into the closed chamber and caused to pass through the porous carrier in contact with the catalyst, and if the catalyst is heated to the aforesaid threshold temperature, combustion will start in the catalyst carrier, where the oxygen of the surrounding air reacts with the fuel.

The advantages of this type of combustion for the generation of heat are very great in many uses. The combustion and the temperature reached at the surface of the catalyst carrier can be very readily and exactly controlled by regulating the quantity of fuel passing through the apparatus. The combustion occurs without flaming and at a relatively low temperature such as 500° to 650° F., so that fire hazard is minimized. At the same time the combustion of carbonaceous or hydro-carbon fuels is complete, so that the products of combustion consist of water vapor and carbon dioxide. Carbon monoxide, if it exists in the fuel or is formed at any stage of the combustion process will be oxidized to carbon dioxide so that the apparatus is suitable for use as unvented space-heating means in enclosures occupied by animals or human beings.

The specific catalysts employed as well as the specific nature of the fuel media do not constitute limitations upon this invention. The invention will be described in exemplary embodiments such as those broadly outlined above.

Hitherto, however, a number of difficulties have been encountered in the manufacture and use of apparatus for catalytic combustion. One of these difficulties was encountered in connection with the catalyst support and catalyst bed. It was found that if a fibrous material such as asbestos, impregnated with a catalyst, was simply compressed in a space, channeling resulted. This channeling meant an uneven distribution of the fuel in the catalyst bed and often resulted in the leakage of fuel. Attempts to correct this led to the use of thicker and thicker layers of catalyst bearing substance. This practice was both uneconomical and inefficient. Such beds were also characterized by a limitation as to the amount of the fuel used and therefore the temperature to which the beds could be driven. Generally, at a temperature above 650° to 700° F. it was found that raw gas was being passed by the bed. It was further discovered that electrical heating elements imbedded in the catalyst layer were subject to extreme corrosion.

It is therefore a primary object of the present invention to provide a method and structure whereby thinner catalyst layers may be used without channeling.

It is an object of the invention to provide a catalytic combustion apparatus with a relatively thin fibrous catalyst bed, but of greatly increased efficiency.

It is an object of the present invention to provide such a catalyst bearing fibrous bed which may be diluted with inert fiber without significant loss of capacity or efficiency.

It is an object of the present invention to provide improved structures for catalytic heating apparatus.

It is an object of the invention to provide a method for making such an improved fibrous catalyst bed.

It is an object of the present invention to provide a machine for making such improved fibrous catalyst beds.

It is an object of the present invention to provide an improved fibrous catalyst bed which may be driven to higher temperatures than hitherto possible without leakage of fuel.

These and other objects of the invention which will be described hereinafter or will be apparent to those skilled in the art upon reading these specifications are accomplished by that method and apparatus of which exemplary embodiments will now be described. Reference is made to the accompanying drawings wherein.

Figures 1, 2, 3, 4:
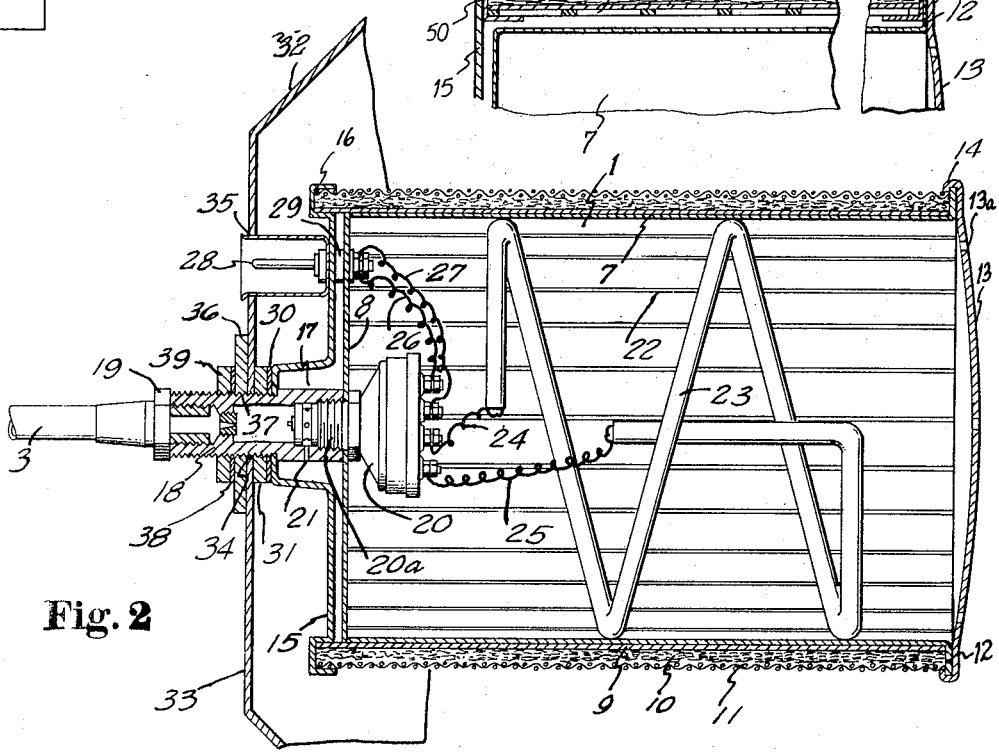
FIG. 1 is a diagrammatic representation of one embodiment of the catalytic heating apparatus of the invention.
FIG. 2 is a cross-sectional view of the catalytic heating apparatus taken along the section line 2—2 of FIG. 1.
FIG. 3 is a cross-sectional view of the fuel valve and fittings therefor of FIG. 2.
FIG. 4 is a partial cross-sectional view of modification of the apparatus of FIG. 2.

FIG. 1 is a diagrammatic representation of one embodiment of the present invention. The heating element 1 of the present invention may be provided with a reflector 2. The element 1 is connected by a conduit 3 to a suitable fuel source 4. The fuel source 4 may be cylinder of any appropriate gaseous fuel such as natural gas, propane and the like. The cylinder has a main valve 5, and an additional pressure regulating valve 6 may be provided in the conduit 3 to reduce the gas pressure to a suitable level.

FIG. 2 is an enlarged sectional view of the heating element 1. This element comprises an inner can 7 with a closed end 8, the other end being open. The exterior of the can 7 is surrounded by a diffuser sheet 9. The diffuser sheet 9 may be made of any suitable substance such as woven or unwoven asbestos or glass fiber. Next, a thin fibrous catalyst bed 10 rests on the diffuser sheet 9 and is held in place by a catalyst retainer 11. The porosity of the diffuser sheet is appreciably lower than that of the catalyst bed so as to build up a back pressure to insure uniform distribution of gaseous fuel flow to the catalyst bed. The catalyst retainer 11 may be made of any suitable heat resistant material. Preferably, it is characterized by at least 80% open area and a minimum blank-off contact with the catalyst surface. Aluminum clad steel screen or perforated aluminum sheet has been found suitable for this purpose. Stainless steel screen or perforated stainless steel sheet with a black oxidized finish for improved radiant efficiency may also be used.

The structure thus far described is cylindrical in configuration and is to be capped at both ends. At one end the can 7 is provided with an outward extending flange 12. A cap member 13 is provided with a circumferentially extending flange 14, substantially U-shaped in cross-section. The flanges 12 and 14 cooperate to hold the cap 13 in place.

The other end of the structure is capped by means of the circular plate 15. The outermost edge 16 of the plate 15 is of U-shaped configuration to receive and retain in gas-tight fashion the diffuser sheet, catalyst bed, and catalyst retainer assembly. It will be noted that the plate 15 is spaced from the end 8 of the can 7 forming a gas receiving chamber generally indicated at 17.

A gas feed fitting 18 (more fully described hereinafter) extends from the chamber 17 through a perforation in the plate 15. The fuel carrying conduit 3 is provided with a suitable fitting 19 which is threaded into the end of the gas feed fitting. A thermastatically actuated gas flow and heater control device 20 is located within the can 7 with a portion 20a extending through a perforation in the end member 8 and threaded into that portion of the gas feed fitting 18 located in the chamber 17. The control device 20, when actuated, will cause the fuel or gas to be emitted through a perforation 21 in the fitting 18 into the chamber 17. In order to insure an even flow of gas to the entire surface of the diffuser sheet 9, the outside surface of the can 7 is provided with a plurality of longitudinal channels or grooves 22. These channels communicate with the chamber 17 and may be narrow and shallow. The channel 21 may be made in the outside surface of the can 7 during or after its fabrication, and may even be scribed therein.

The interior of the can 7 is also provided with a heating element. As shown in FIGURE 2, this element may take the form of a spiral or coiled element 23, the convolutions of which are of dimensions slightly greater than the interior diameter of the can itself. Thus when placed in position, the heating element retains its position by being sprung against interior surface of the can. The heating element may be a metal sheathed nichrome element. The element 23 is connected by leads 24 and 25 to the control device 20. The device 20 is in turn connected by leads 26 and 27 to an electrical plug-in assembly 28. It will be understood by one skilled in the art that such a plug-in terminal is especially desirable in a portable heating unit, but in a permanent installation may be replaced by a standard terminal box. Since the plug-in assembly 28 extends through perforations in the end 8 and the plate 15, a high temperature spacer and gasket 29 may be placed in the gas chamber 17 to seal these perforations. The cap 13 may be provided with hole 13a to accommodate the expansion of the air within the can 7 when the element 23 is operating.

As illustrated in FIGS. 2 and 3, a gasket 30 is placed on the fitting 18 and against the plate 15. This in turn is held in place by a jam nut 31. The embodiment illustrated in FIG. 2 may be provided with a reflector. The reflector may be of any suitable configuration, and for purposes of an exemplary showing, a conical or parabolic reflector is illustrated in FIGS. 1 and 2 at 2 and 32 respectively. The reflector has a flat portion 33. The center of the portion 33 has a perforation 34 to enable the fitting 18 to pass through the reflector. The flat portion 33 may also be provided with an off-center perforation 35 enabling the electrical plug-in assembly to extend therethrough. A bracket or support member of any suitable configuration, generally indicated at 36, may be affixed to the reflector and provided with a hole 37 coaxial with the perforation 34. The reflector and bracket assembly is held in place on the fitting 18 by means of a lockwasher 38 and jam nut 39.

The gas feed fitting 18 and the gas flow and heater control device 20 are most clearly shown in FIG. 3. The fitting 18 is provided at its intake end with an internally threaded perforation 40 to receive the fitting 19. The perforation 40 leads to a perforation 41 of reduced diameter into which is threaded an orifice set screw 42 having a tapered V-shaped slot 43. By adjusting the depth to which the set screw 42 is threaded into the perforation 41, the gas flow entering the passage 44 may be restricted. This adjustment may be made with the aid of a flow meter before assembly of the heating device. As will be understood by one skilled in the art, a fixed orifice may be used rather than the screw 42.

The passage 44 widens into a perforation 45 a part of which is internally threaded at 46 to receive the end 20a of the control device 20.

The device 20 may be any suitable temperature actuated switch and valve mechanism, and does not constitute a limitation on the present invention. For purposes of an exemplary showing, the device 20 is illustrated as the type employing a diaphragm which is depressed inwardly when the device reaches a certain temperature level. This diaphragm (not shown) when in depressed condition, serves not only to disconnect the heating element 23, but also to permit the flow of gas from the passage 44 through the holes 47 into the perforation 45. Thence, the gas will pass through the hole 21 in the fitting 18 into the chamber 17.

The operation of the embodiment of FIGURES 1, 2 and 3 is as follows. When a gas cylinder is used, the main valve 5 is opened allowing gas to pass through the conduit 3 and pressure regulating valve 6 into the fitting 18. Electrical connection is made with the plug-in terminal 28. This actuates the heating element 23, which in turn brings the catalyst bed 10 to its threshold temperature. The control device 20 is set to respond at this threshold temperature. Response by the control device 20 disconnects the heating element 23 and simultaneously opens the holes 47 allowing gas to flow into the chamber 17. The gas flows along the channels 22 and penetrates the diffuser sheet 9 into the catalyst bed 10. The exothermic reaction mentioned above takes place and the catalytic heating apparatus is then in full operation. The amount of heat given off may be varied by regulating the flow of gas. The device is turned off by shutting off the gas flow and breaking the electrical connection with the plug-in element 28.

A modification of the device of FIGURE 2 is illustrated in FIGURE 4. Like elements have like index numerals. The inner can 7 is provided at its open end with a flange 12. The plate 15 has a peripheral flange 38. A cylindrical support 49 is provided at either end with flanges 50 and 51. The support 49 is held in spaced relationship with respect to the can 7 (creating a gas passage) by means of flanges 50 and 51 abutting the plate 15 and the flange 12 respectively. The support 49 may be made of metal screen, or expanded aluminum or steel as illustrated. The support is surrounded by a diffuser sheet 9. The diffuser sheet will in turn be surrounded by a catalyst bed 10 and a catalyst retainer 11. The cap 13 is held in place by means of metal screws 52 passing through the cap and flanges 12 and 51.

It will be understood by one skilled in the art, that the support 49 and diffuser sheet 9 may be replaced by a rigid tube of glass or asbestos fiber serving both as a support and a diffuser. It will further be understood that the support 49 could be replaced by a thin layer of loose glass or asbestos fiber, which passes gas freely, wrapped about the can 7 and serving as a gas passing support between it and the diffuser sheet 9.

Figure 7:
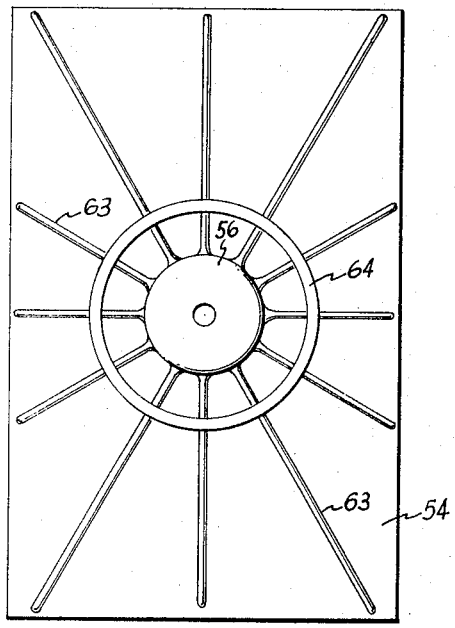
FIG. 7 is a plan view of the under side of the device of FIG. 5 with the outer casing removed.
Figure 5:
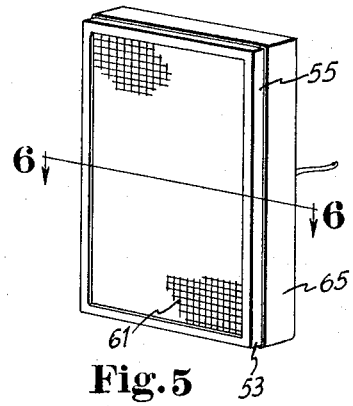
FIG. 5 is a perspective view of another embodiment of the catalytic heating device of the present invention.

Another embodiment of the present invention is illustrated in FIGURES 5 and 7. This embodiment comprises a flat pan-like support of high heat conducting metal generally indicated at 53. This support may be of any shape including square or rectangular as illustrated in FIGURES 5 and 7. The member 53 has a flat support area 54 and upturned edges 55. The member 53 is also provided with a centrally located depression 56. This depression houses a gas flow and heater control device 57 similar to the control device 20 of FIGURE 2. The depression 56 also houses a gas feed fitting 57 which may be similar to the fitting 18 of FIGURE 2. A portion of the fitting 57 extends through a perforation 58 in the depression 56. A diffuser sheet 59 is laid directly on the support area 54, and in turn supports a catalyst bed 60 and a catalyst retainer 61. The elements 59, 60 and 61 correspond to the elements 9, 10 and 11 of FIGURE 2. The edges 55 may be provided with flanges 55a to hold the retainer 61 in place.

Gas in the chamber 62 formed by the depression 56 is led over the entire area of the diffuser sheet by means of longitudinal depressions or channels 63. This channels are formed in the support area 54 and extend radially form the chamber 62. In this instance, a flat ring heater 64 may be employed, located on the outside surface of the support member 53. The heater 64 is connected by suitable means not shown, to an external source of electricity and to the control device 57.

Figure 6:
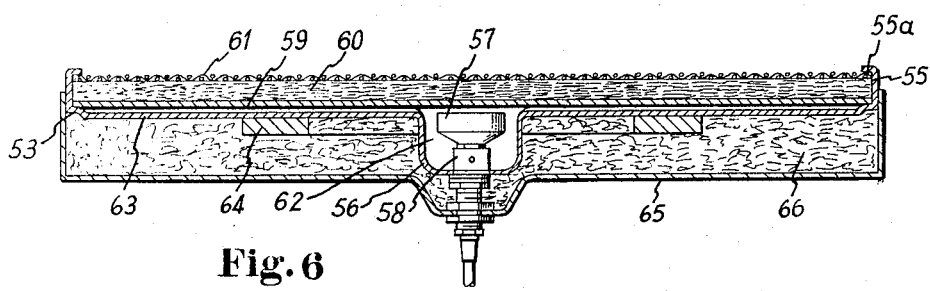
FIG. 6 is a cross-sectional view of the apparatus of FIG. 5 taken along the section line 6—6.

Referring to FIGURES 5 and 6, an outer casing or cover 65 may be provided to enclose the heating element 64. The space between the cover 65 and support 53 may be filled with asbestos or glass fibers generally indicated at 66.

The operation of the emobdiment of FIGURES 5 through 7 is generally the same as that described with respect to the embodiment of FIGURES 1 through 3.

Figure 8:
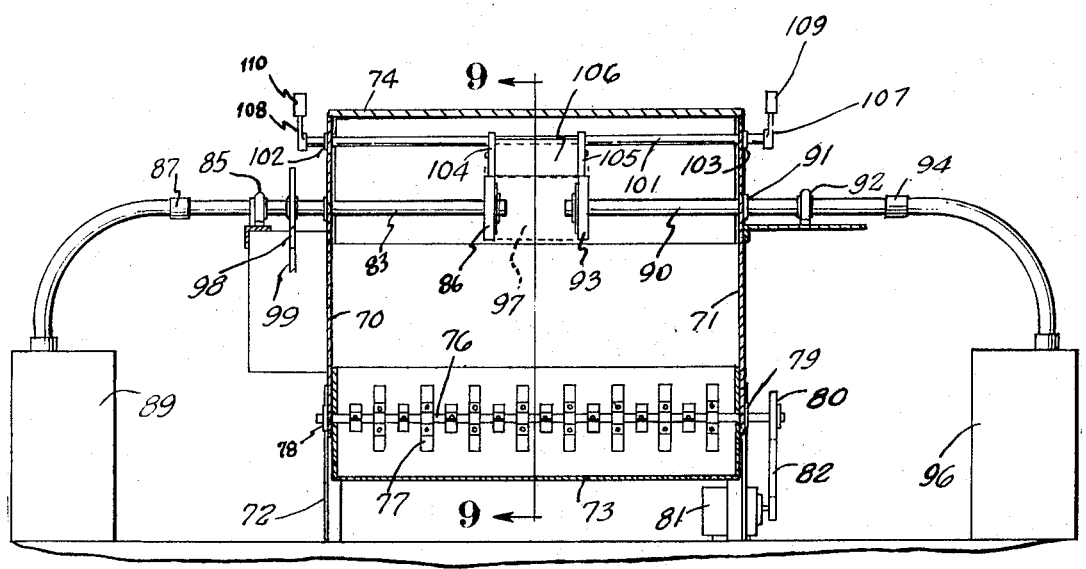
FIG. 8 is a elevational view of the machine for making the improved fibrous catalyst beds.
Figure 9:
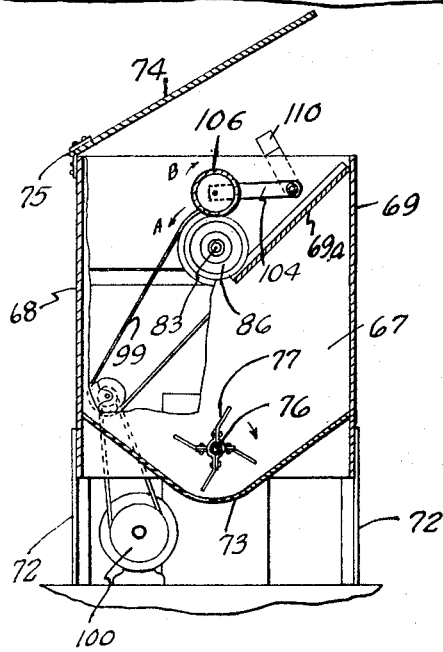
FIG. 9 is a cross-sectional view of the machine of FIG. 8 taken along the section line 9—9.

FIGURES 8 and 9 illustrate a machine for making the catalyst bed. The machine comprises a rectangular chamber 67 with a vertical back wall 68, a front wall 69, and end or side walls 70 and 71. The machine is mounted on suitable support members generally at 72. The chamber 67 has a bottom 73 of U-shaped configuration. A top 74 is pivotally mounted to the back wall 68 by means of hinges 75. The top 74 may be provided with a window, or may be made entirely of clear plastic or the like so that the operation of the elements within the chamber 67 may be observed when the lid is in closed position.

A shaft 76 bearing a plurality of blades or beaters 77 is rotatively mounted in bearings 78 and 79 in end walls 70 and 71 respectively. The shaft 76 is so positioned that the blades 77 pass in close proximity to the lowermost portion of the U-shaped bottom member 73. Any suitable power source may be employed to cause the shaft 76 to rotate. As an exemplary showing, a portion of the shaft 76 may extend outside the end wall 71 and be provided with a pulley 80. The pulley 80 is in turn connected with a motor 81 by means of a belt 82.

A shaft 83 is rotatively mounted in a bearing 84 in the side wall 70 and a bearing 85 located outside of the chamber 67. The shaft 83 is adjustable axially within the bearings 84 and 85 and is capable of extending at least half way across the chamber 67. The end of the shaft 83 extending into the chamber 67 is provided with a circular abutment means 86. The shaft 83 is hollow and is rotatively connected outside the chamber 67 at 87 to a conduit 88 leading to a vacuum source 89. The vacuum source may be of any suitable type well known in the art. A second hollow shaft 90, coaxial with the shaft 83 and similar to it, is rotatively mounted in a bearing 91 in the sidewall 71 and a second bearing 92 outside the chamber 67. The shaft 90 is also provided with a circular abutment means 93 and a connection 94 to a conduit 95 leading to a vacuum source 96. The shaft 90 is also adjustable longitudinally within the bearings 90 and 92, and is capable of extending at least half way across the chamber 67. Thus, the abutment means 86 and 93 are coaxial and may be moved toward or away from each other.

The abutment means 86 and 93 are adapted to engage the end of a foraminous cylindrical member 97 shown in dotted lines and more fully described hereinafter. A pulley 98 is adjustably and non-rotatably affixed to the shaft 83 and is connected by means of a belt 99 to a power source 100. Thus, when the shaft 83 is caused to rotate in the direction of the arrow A, its rotation will be imparted to the shaft 90 through the foraminous cylindrical member 97.

A second shaft 101 is rotatively mounted in bearings 102 and 103 in side members 70 and 71 respectively. The portion of this shaft in the center of the chamber 67 bears arms 104 and 105. A cylindrical idler member 106 is removably and rotatively mounted between the arms 104 and 105 with its axis parallel to but not coaxial with the shaft 101. It will be noted from FIG. 9, that when the idler 106 is in its lowermost position, it will rest against the foraminous cylinder 97. Either or both ends of the shaft 101 may be made to extend outside of the walls 70 and 71, and be provided at their ends with arms 107 and 108. The ends of these arms are provided with adjustable weights 109 and 110 respectively. It will be understood that these arm and weight assemblies will cause the idler member 106 to bear against the foraminous cylindrical member 97. It is preferable to provide an idler member of approximately the same length as the foraminous cylinder 97.

For purposes of an exemplary showing, the operation of the machine will be described with respect to the formation of a catalyst bed of the type required for the embodiment illustrated in FIG. 2. A foraminous cylindrical member 97 of approximately the same diameter as the can 7 is placed and held firmly between the abutment means 86 and 93. An idler 106 of approximately the same length is also provided. The fibrous catalyst material, as for example platenized asbestos, is placed in the U-shaped bottom 73 of the machine. The foraminous cylinder 97 is provided with a diffuser sheet 9 wrapped thereabout. First, the shaft 76 with its blades 77 is caused to rotate at high speed. This results in a beating of the fibrous catalyst material causing it to be suspended in air within the chamber 67 in the form of small patches of fibers often referred to as "chicken feathers." Next the shafts 83 and 90 are caused to rotate resulting in the rotation of the foraminous cylindrical member 97 with the diffuser sheet thereon in the direction of the arrow A, and in turn causing the idler member 106 to rotate in the direction of the arrow B. Finally, the vacuum sources 89 and 96 are actuated causing a vacuum to be pulled within the foraminous cylinder 97. As a result, the suspended fibrous catalyst material in the form of "chicken feathers" is attracted to and forms a bed on the diffuser sheet. An inwardly and downwardly slanting baffle 69a may be affixed to the front wall 69 to aid in directing the air-suspended catalyst material toward the cylindrical member 97. The idler member 106 tends to pack the catalyst material and when a bed of suitable thickness has been formed on the diffuser sheet the shaft 76 is stopped, the vacuum sources 89 and 96 are turned off, and finally shafts 83 and 90 are stopped. The cylindrical member 97 is removed from between the abutments 86 and 93 and the diffuser sheet and catalyst layer or bed are removed from the foraminous cylinder.

It will be understood that the support 49 of FIG. 4 may be substituted for the foraminous cylinder 97 when making the embodiment of FIG. 4. When the support 49 and diffuser sheet 9 are replaced by a rigid or semirigid cylindrical member of glass or asbestor fiber, these cylindrical members may be substituted for the foraminous member 97.

When making the catalyst bed illustrated in FIG. 6 a foraminous cylinder 97 of suitable size is used. When the bed has been formed, it is removed from the foraminous cylinder and cut and flattened to form a flat catalyst bed.

Heretofore catalyst beds for catalytic heating devices have been characterized by non-uniformity and channeling. Attempts to overcome this led to increasing the thickness of the catalyst beds, and it was usual practice to make beds of a thickness of 1 to 1½ inches or more.

In use such beds tended to pass raw gas upon reaching a temperature of 650° to 700° F. It has also been suggested that such beds be water felted.

Catalyst beds made by the air felting and vacuum deposition process outlined above have been found to possess remarkable characteristics. Unlike previous beds including water felted beds, the catalyst beds of the present invention have a definite layer structure within the bed itself. The individual fibers within a layer are flat in the plane of the layer, but otherwise randomly oriented.

While the thickness of the catalyst bed does not form a limitation on the present invention, it has been found that thicknesses ranging from 1/8 to 3/8 of an inch and a denisty of 5 to 8 pounds per cubic foot are characterized by excellent diffusion, and no channels. The efficiency of such beds is markedly increased, producing 2 to 4 times the number of B.t.u. per gram of catalyst over previous beds. This is true by virtue of the more thorough exposure of the catalyst to the reactants as a result of the unique layered structure of this catalyst bed. There is a forced redistribution of the gas within and between each layer as it passes through the bed, thereby getting maximum exposure of the surface of the individual fibers. Catalyst beds of the type described in the present application have reached temperatures ranging from 1000° to 1200° F. or higher without passing raw gas. Further, they may be diluted with 50% or more inert fiber without demonstrating a noticeable loss of output or efficiency when compared to an undiluted bed of the same size, thickness and weight. This dilution or mixing may take place in the beating operation in the above described machine.

Modifications may be made in the present invention without departing from the spirit of it. For example, cylindrical heating units of the type shown in FIGS. 1 through 4 may be made of any desired length and may be provided with trough-like reflectors rather than parabolic or conical reflectors. The various catalytic heating devices of the present application may be made in the form of portable units or stationary fixtures. It is also possible to provide units of the type described without a heating element. Preheating is accomplished by a brief period of open flame combustion of the fuel on the outer surface of the catalyst bed.

It will be obvious to one skilled in the art that the fibrous catalytic bed above described with respect to apparatus for catalytic heaters may also be used with corresponding advantages in other catalytic reactions.

The invention having been described in certain exemplary embodiments, what is claimed as new and desired to be secured by Letters Patent is:

1. A method of making an air felted fibrous catalyst bed having distinct layers within said bed, comprising the steps of providing an enclosed chamber, agitating catalyst bearing fibers within said chamber to air suspend them, providing a cylindrical foraminous member within said chamber, causing said suspended fibers to be deposited about the whole periphery of said cylindrical foraminous member by drawing a vacuum within said cylindrical member, and rotating said cylindrical member through a plurality of complete revolutions during said deposition whereby to form said bed having said layers.

2. The method claimed in claim 1 including the step of exerting mechanical pressure on said catalyst bed as it is being formed.

3. An apparatus for air felting a fibrous catalyst bed comprising a closed housing, means in the lower part of said housing for beating, agitating and suspending in a gaseous medium fibers bearing a catalytic substance, a pair of axially movable aligned hollow shafts in the upper part of said housing, a hollow foraminous cylinder, means on the ends of said shafts for engaging and extending across the ends of said cylinder, means for evacuating gas through said hollow shafts whereby to evacuate said cylinder and means for rotating said shafts whereby to rotate said cylinder.

4. The structure claimed in claim 3 including a roller in said housing bearing against the periphery of said cylinder.

5. A method of making an air felted fibrous catalyst bed comprising the steps of providing an enclosed chamber, placing catalyst bearing fibers within said chamber, agitating said fibers within said chamber to air suspend them, supporting a cylindrical foraminous member wholly within said chamber, rotating said member and evacuating said member so as to build up a multi-layer bed of said fibers on said members by deposition of said fibers thereon, and removing said member and said bed from said chamber.

6. The process claimed in claim 5 including the step of imposing a diffuser layer on said member prior to rotating said member.

7. The process claimed in claim 5 including the step of exerting mechanical pressure on said catalyst bed as it is being formed.

8. An apparatus for air felting a fibrous catalyst bed having distinct layers within said bed comprising an enclosed chamber, said chamber having a U-shaped bottom for reception of the fibrous catalyst material, means within said chamber near said U-shaped bottom to agitate said catalyst material causing it to become suspended in the air within said chamber, a foraminous cylindrical support wholly within said chamber, means for evacuating within said cylindrical support to cause said air suspended catalyst material to be deposited about the whole periphery of said support, means for rotating said support through a plurality of revolutions during said deposition of said catalyst material so as to form said bed having said deposited layers, a rotatable cylindrical member within said said chamber, means to cause to said cylindrical member to ride upon said cylindrical support and exert mechanical pressure upon said bed as it is formed.

9. An air felted fibrous catalyst bed for apparatus for catalytic combustion comprising a bed felted from catalyst bearing fibers, said fibers being arranged in uniform but clinging layers within said bed, the fibers in each of said layers being randomly oriented in the plane of said layer, a foraminous support forming a part of said bed, said catalyst bearing fibers being felted upon said foraminous support.

10. An air felted fibrous catalyst bed for apparatus for catalytic combustion comprising a bed felted from catalyst bearing fibers, said fibers being arranged in uniform but clinging layers within said bed, the fibers in each of said layers being randomly oriented in the plane of said layer, a preformed diffuser layer, said catalyst bearing fibers being felted upon said diffuser layer.

References Cited by the Examiner

UNITED STATES PATENTS

| | | | |
|---|---|---|---|
| 1,502,807 | 7/1924 | Berger. | |
| 2,102,153 | 12/1937 | Hays | 158—99 |
| 2,152,901 | 4/1939 | Manning. | |
| 2,509,014 | 5/1950 | Payne et al. | 252—410 |
| 2,741,602 | 4/1956 | McKinley et al. | 252—410 |
| 2,940,135 | 6/1960 | Heritage | 19—156.3 |
| 2,999,534 | 9/1961 | Wagner | 158—99 |

FOREIGN PATENTS

| | | |
|---|---|---|
| 294,079 | 2/1915 | Germany. |
| 422,226 | 1/1935 | Great Britain. |

OSCAR R. VERTIZ, *Primary Examiner.*

FREDERICK L. MATTESON, JR., MAURICE A. BRINDISI, *Examiners.*

R. D. EDMONDS, H. S. MILLER, R. M. DAVIDSON, E. C. THOMAS, *Assistant Examiners.*